Aug. 26, 1969 H. B. McKEAN 3,462,907
UTILITY POLE WITH CURVED, LAMINATED WOOD BEAMS
Filed May 19, 1967 3 Sheets-Sheet 1
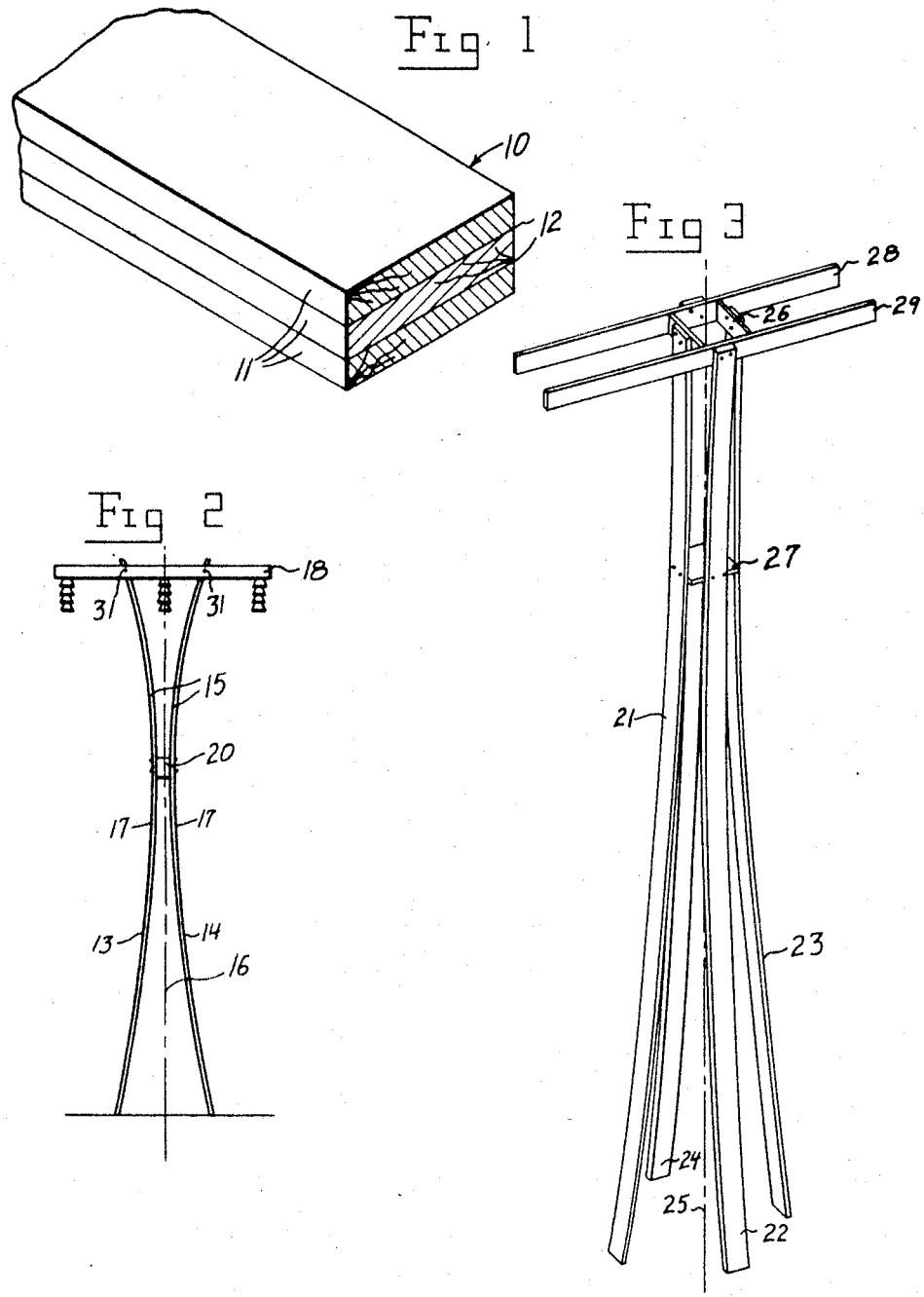
INVENTOR.
HERBERT B. McKEAN
BY Wells & St. John
ATTYS.

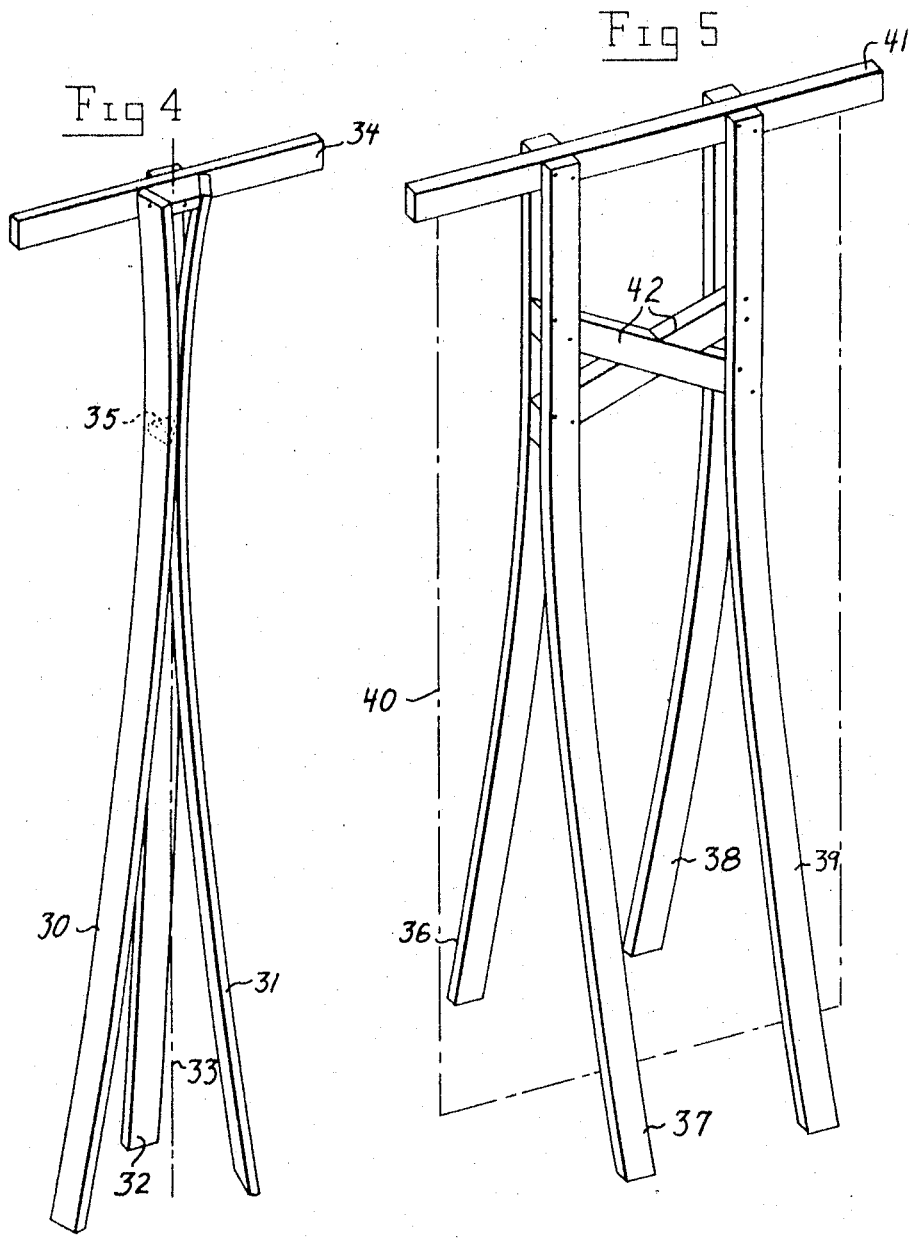

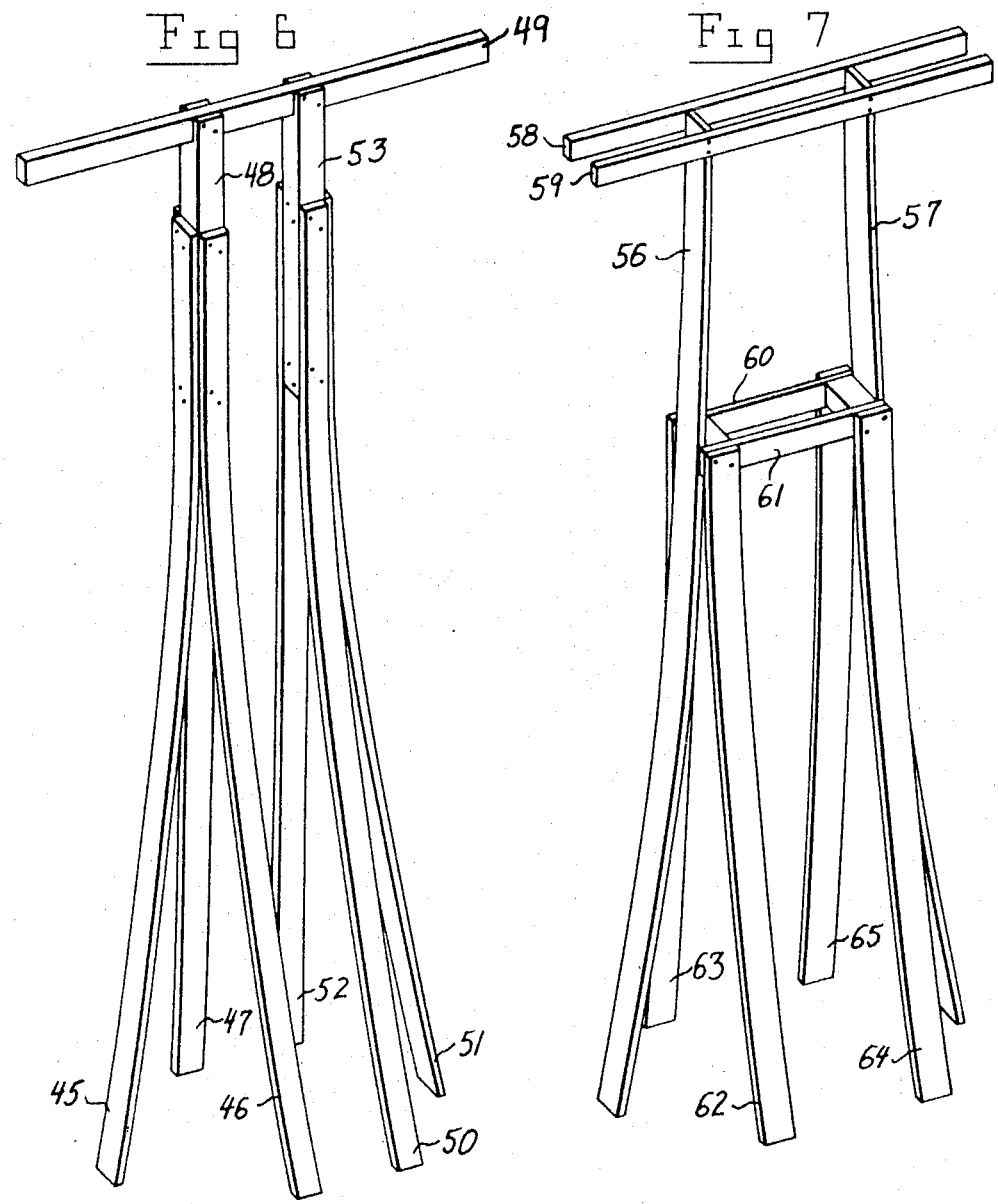

{ # United States Patent Office

3,462,907
Patented Aug. 26, 1969

3,462,907
UTILITY POLE WITH CURVED, LAMINATED WOOD BEAMS
Herbert B. McKean, Lewiston, Idaho, assignor to Potlatch Forests, Inc., Lewiston, Idaho, a corporation of Delaware
Filed May 19, 1967, Ser. No. 639,732
Int. Cl. E04c *3/30;* E04h *12/08*
U.S. Cl. 52—721                              1 Claim

ABSTRACT OF THE DISCLOSURE

The disclosure describes a utility pole having a transverse cross member 18 for supporting the electrical lines. The cross member 18 is supported by two bowed laminated beams 13 and 14 that extend from the ground to the cross member 18. The two beams have their convex surfaces opposing one another and facing the center 16 of the pole load. The beams are positioned with their laminated planes facing the convex surfaces. The beams are interconnected by a spacer block 20 positioned below the cross member and above the midpoint of the beams.

BACKGROUND OF THE INVENTION

My invention relates to utility poles and more particularly to utility poles having wood elevation supports.

The general formula for calculating the stresses encountered in a utility pole by horizontal forces is as follows:

$$S = MC/I$$

where S is the fiber stress at a selected plane, M is the bending moment in the beam at the selected plane, C is the distance from the neutral axis to the selected plane and I is the moment of inertia. It may be seen that the greater the moment of inertia the smaller the stress for any given force applied to the utility pole. Furthermore it is generally recognized that the bending moment M increases as the distance between the application of the force and the selected plane increases. Thus for a utility pole the maximum bending moment is encountered at approximately ground level. It is particularly advantageous to construct a utility pole in which the moment of inertia also increases to a maximum at the ground level to counteract the bending moment.

Also in the design of a utility pole, in which the total height greatly exceeds the cross section, considerable attention must be given to the problem of substantially increased bending forces produced by vertical forces when the pole is deflected. It is well recognized that bending stresses build up rapidly with any deflection in the pole when subjected to substantial vertical forces. Therefore it is particularly advantageous in the design of a utility pole to make provision for resisting the deflection of the pole to minimize the bending stresses.

Besides the structural aspects of utility poles, the aesthetic appearance of the poles is quite important.

There is a need in the electrical transmission industry for utility poles that are lightweight and aesthetically pleasing in appearance. Presently, most of the utility poles utilize unattractive, preservatively treated tree trunks for the elevated supports. Because of these unsightly utility poles, much effort has been made to bury the electrical lines in the ground, whenever feasible. Particularly in urban areas, unsightliness of the present utility poles has detracted from the surroundings to the point of accelerating urban decay.

Some of the larger utility poles or towers utilize girded metal structures as the elevating support. In many of the remote areas it is necessary to use helicopters to transport the metal structures to place of erection. However, because the structures are too heavy to lift by helicopter, they must be taken in sections and assembled at the erection site. This substantially increases the in-place cost of the erected towers. Furthermore often the poles or towers require the use of guy wires to provide the necessary structural rigidity and safety.

One of the principal objects of my invention is to provide a utility pole that is aesthetically pleasing and does not detract from the surroundings.

Another principal object of my invention is to provide a utility pole that has provisions for resisting deflection and for increasing the moment of inertia to a maximum at the ground level without the use of guy wires.

An additional object of my invention is to provide a utility pole that has a high strength to weight ratio.

A further object of my invention is to provide a utility pole that is simple to assemble, particularly in remote areas.

An additional object of my invention is to provide a utility pole that incorporates laminated beams that are made by well-known techniques.

A further object of my invention is to provide a utility pole that is relatively inexpensive to manufacture and to transport to the place of erection.

A still further object of my invention is to provide a utility pole structure having a few light weight parts that are easy to transport.

Another object of this invention is to provide a utility pole structure in which great height may be obtained from laminated pieces whose lengths are less than the total height of the structure.

SUMMARY OF THE INVENTION

My invention contemplates a utility pole that has a cross member supported by bowed laminated beams that extend from the ground to the cross electrical lines in which the convex surfaces of the beams face the center of the load. More particularly my invention contemplates a spacer block interconnecting the beams at a point above the midpoints of the beams with the beams flared from the spacer block connection to the ground.

BRIEF DESCRIPTION OF THE DRAWINGS

FIG. 1 is a fragmentary perspective view of a portion of a laminated beam;

FIG. 2 is a front view of the utility pole utilizing two oposed bowed laminated beam supports incorporating the principal features of my invention;

FIG. 3 is a perspective view of an alternate embodiment utilizing four opposed laminated beam supports;

FIG. 4 is a perspective view of an alternate embodiment utilizing three opposed laminated beam supports;

FIG. 5 is a perspective view of an alternate embodiment;

FIG. 6 is a perspective view of an alternate embodiment; and

FIG. 7 is a perspective view of an alternate embodi-

DESCRIPTION OF THE PREFERRED AND ALTERNATE EMBODIMENTS

Referring now in detail to FIG. 1, there is shown a laminated beam 10 comprising a plurality of boards 11 that are secured together by well-known laminating techniques 12 along parallel planes between the faces of the boards. The number and sizes of the boards used in forming a beam may be varied depending upon the load requirements for the pole.

Referring to FIG. 2 there are shown two bowed beams 13 and 14 that are positioned opposing each other transverse to the electrical lines. The convex surfaces 15 of the beams 13 and 14 are an equal distance from and face the center 16 of the pole load. The concave surfaces 17 of the beams 13 and 14 face outwardly. Each of the beams 13 and 14 curve from the ground to a cross member 18 that is mounted transverse to the electrical lines. The upper ends of the beams 13 and 14 are connected to the cross member 18 at equal distances from the center thereof. A spacer block 20 is attached to or interconnects the beams 13 and 14 at a point above the midpoints of the beams 13 and 14 for maintaining the beams in a bowed condition. As may be seen in FIG. 2 the distance between the beams at the ground level and the cross member 18 is greater than at the suacer block to flare the beams as they extend down from the spacer block. Because of the flared aspect of the base of the utility pole, the moment of inertia increases from the spacer block 20 to the base ends of the beams 13 and 14 so that the maximum moment of inertia occurs at approximately ground level. Also the flared aspect of the base resists any deflection in the pole.

The beams are attached to the cross member 18 and the spacer block 20 by shear connectors 31, such as bolts or shear plates and ring connectors. The lower ends of the beams 13 or 14 may be secured to the ground by any known method such as embedding or anchoring to maintain the spacing therebetween at the ground level. The beams 13 and 14 are particularly effective in resisting side forces that are exerted on the pole, i.e., forces that are transverse to the electrical lines.

FIG. 3 shows a pole support having four bowed laminated beams 21, 22, 23 and 24. The beams are equally spaced about the center 25 of the pole load in a rectangular arrangement. The lamination planes face the convex surfaces of the beams. The beams extend from the ground to a notched platform 26 that spreads the upper ends of the beams an equal distance from the center 25. A notched spacer block 27 interconnects the beams at a point above the mid-distance of the beams so that the distance between the opposing beams is minimum at the spacer block 27 causing the beams to be flared in both directions from the spacer block 27. Cross members 28 and 29 are connected to the upper ends of the beams for supporting the electrical lines. The beams 21, 22, 23 and 24 are particularly effective for resisting both longitudinal and transverse forces applied to the pole.

FIG. 4 shows a utility pole having three bowed beams 30, 31 and 32 that are equally spaced about and facing the center 33 of the pole load. The lamination planes face the convex surfaces of the beams. The beams 30, 31 and 32 extend from the ground to a cross member 34. The upper ends of the beams are connected to the cross member in the same general vicinity. A spacer block 35 interconnects the beams intermediate the beam ends and slightly above the midpoints. The spacer block 35 is of sufficient size so that the minimum distance between beams occurs intermediate the spacer block 35 and the cross member 34. Beams 30, 31 and 32 are effective to resist both the longitudinal and transverse forces applied to the pole.

FIG. 5 shows a utility pole have two sets of elevation support members. The first set has two opposing bowed laminated beams 36 and 37. The second set has two similar opposing beams 38 and 39. Each of the beams 36, 37, 38 and 39 has its convex surface facing the center 40 of the pole load which extends as a vertical plane through a cross member 41. The beams extended from the ground to the cross member support 41. Beams 36 and 37 are connected to the cross member 41 spaced from the beams 38 and 39. The beams 36 and 37 are connected to the beams 38 and 39 below the cross member 41 by diagonal braces 42. The braces 42 provide structural integrity between the two sets of support members for resisting transverse forces applied to the pole. The bowed beams 36, 37, 38 and 39 resist longitudinal forces applied to the pole. The utility pole shown in FIG. 5 is mainly designed for large loads.

The utility pole shown in FIG. 6 is mainly for suspending very heavy loads at substantial heights by using laminated beam pieces whose individual lengths are less than the total height of the pole. The pole has two sets of laminated beam supports. The first sets has three facing bowed beams 45, 46 and 47 that extend from the ground to a center beam 48. The bowed beams 45, 46 and 47 terminate below a cross member 49. The center beam 48 extends upwardly from the bowed beams 45, 46 and 47 to support the cross member 49. As shown the bowed beans 45, 46 and 47 extend downwardly and outward in a flared manner to provide additional rigidity and strength characteristics to the pole. The second set has similar flared beams 50, 51 and 52. A center beam 53 extends from the beams 50, 51 and 52 to support the cross member 49. The bowed beams 45–47 and 50–52 have lengths that are substantially less than the total height of the pole. In this manner a very tall pole may be constructed by light weight laminated beams that may be easily transported and assembled at the erection site. It is particularly desirable to make the beams 45–47 and 50–52 with lengths that are between one-half and two-thirds the total height of the pole.

The bowed beams 45–47 and 50–52 are connected to the base of the center beams 48 and 53 respectively by suitable connectors 54. The base of the center beams serve also as spacer blocks for separating the curved beams.

The utility pole shown in FIG. 7 has two spaced and opposing laminated beams 56 and 57 that are bowed in opposite directions transverse to the electrical lines. The beams 56 and 57 extend from the ground to cross members 58 and 59 that are attached to the sides. The beams 56 and 57 provide spaced elevation support for the cross members 58 and 59. Spacer blocks 60 and 61 extend between the beams 56 and 57 below the cross members. A bowed front support 62 and a bowed rear support 63 are attached to the spacer blocks 60 and 61 adjacent the beam 56. The supports 62 and 63 flared outwardly to the ground to provide longitudinal support to the beam 56. A bowed front support 64 and a bowed rear support 65 are connected to the spacer blocks 60 and 61 adjacent the beam 57. Supports 64 and 65 flare outwardly to the ground to provide longitudinal support to the beam 57. The beams 56 and 57 resist the side forces applied to the pole.

The front supports 62 and 64 and the back supports 63 and 65 shown in FIG. 7 may be laminated beams. The laminated beams have a natural tendency to resume a straight condition. Since the beams are bowed and flared into the ground, they have a tendency to straighten and to resist any additional forces tending to further bow the beams. Since the bowed beams are inteconnected and opposing they maintain the pole in a vertical position.

It is understood that the above described embodiments are simply illustrative of the application of the principles of my invention. Numerous other arrangements may be readily devised by those skilled in the art which will embody the principles of my invention and fall within the spirit and scope thereof. Therefore, only the following claim is intended to define my invention.

What I claim is:

1. A utility pole for supporting electrical lines, comprising:
 (a) a plurality of facing curved laminated wood beams extending from the ground to a cross member for supporting electrical lines above the ground level, in which each of the curved laminated wood beams is formed by laminating together a plurality of wooden boards, and
 (b) a spacer block interconnecting the beam intermediate the ground level and the cross member in which each of the beams is flared outwardly at the ground level and above the spacer block to the cross member.

References Cited

UNITED STATES PATENTS

| | | | |
|---|---|---|---|
| 731,109 | 6/1903 | Knupp | 52—40 |
| 764,472 | 7/1904 | Kessler | 52—40 X |
| 823,377 | 6/1906 | Van Every | 174—45 |
| 1,696,773 | 12/1928 | Malone | 52—721 X |
| 3,299,586 | 1/1967 | Hockaday | 52—40 |
| 1,189,596 | 7/1916 | McFadden | 248—163 X |
| 2,562,022 | 7/1951 | Duer | 248—163 X |

FOREIGN PATENTS

| | | |
|---|---|---|
| 167,336 | 12/1950 | Austria. |
| 614,659 | 9/1926 | France. |
| 1,129,240 | 9/1956 | France. |
| 428,703 | 12/1947 | Italy. |
| 873,354 | 7/1961 | Great Britain. |

OTHER REFERENCES

The Washington Post, Friday, May 6, 1966, page 2, the pole at right of photograph.

ALFRED C. PERHAM, Primary Examiner

U.S. Cl. X.R.

52—40, 654, 697; 174—45